(12) United States Patent
Gschwind et al.

(10) Patent No.: US 7,225,431 B2
(45) Date of Patent: May 29, 2007

(54) METHOD AND APPARATUS FOR SETTING BREAKPOINTS WHEN DEBUGGING INTEGRATED EXECUTABLES IN A HETEROGENEOUS ARCHITECTURE

(75) Inventors: Michael Karl Gschwind, Chappaqua, NY (US); Kathryn M. O'Brien, South Salem, NY (US); John Kevin O'Brien, South Salem, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 10/280,677

(22) Filed: Oct. 24, 2002

(65) Prior Publication Data

US 2004/0083458 A1    Apr. 29, 2004

(51) Int. Cl.
*G06F 9/44* (2006.01)
*G06F 9/45* (2006.01)
*G06F 15/00* (2006.01)
*G06F 15/76* (2006.01)
*G06F 9/30* (2006.01)

(52) U.S. Cl. .................. 717/129; 717/149; 712/1; 712/203; 712/227

(58) Field of Classification Search .............. 717/129, 717/124–128, 130–135, 149; 712/227, 244; 714/35, 38
See application file for complete search history.

(56) References Cited

U.S. PATENT DOCUMENTS

| | | | |
|---|---|---|---|
| 4,882,674 A | 11/1989 | Quint et al. | |
| 5,339,430 A | 8/1994 | Lundin et al. | |
| 5,659,701 A | 8/1997 | Amit et al. | |
| 5,664,159 A * | 9/1997 | Richter et al. ................ 703/23 |
| 5,684,955 A | 11/1997 | Meyer et al. | |
| 5,761,137 A | 6/1998 | Johnson et al. | |
| 5,812,848 A | 9/1998 | Cohen | |
| 5,960,466 A | 9/1999 | Belgard | |
| 6,006,248 A | 12/1999 | Nagae | |
| 6,077,312 A * | 6/2000 | Bates et al. ................ 717/129 |
| 6,119,247 A | 9/2000 | House et al. | |
| 6,138,209 A | 10/2000 | Krolak et al. | |
| 6,145,119 A | 11/2000 | House et al. | |
| 6,157,960 A | 12/2000 | Kaminsky et al. | |
| 6,202,200 B1 | 3/2001 | House et al. | |
| 6,209,061 B1 | 3/2001 | Nelson et al. | |
| 6,219,803 B1 | 4/2001 | Casella et al. | |
| 6,427,234 B1 | 7/2002 | Chambers et al. | |
| 6,430,600 B1 | 8/2002 | Yokote | |

(Continued)

OTHER PUBLICATIONS

Tanenbaum, "Structured Computer Organization", 1984, Prentice-Hall, Inc., p. 10-12.

(Continued)

*Primary Examiner*—Antony Nguyen-Ba
(74) *Attorney, Agent, or Firm*—Carr LLP; D'Ann Rifai

(57) ABSTRACT

The present invention provides inserting and deleting a breakpoint in a parallel processing system. A breakpoint is inserted in a module loaded into the execution environment of an attached processor unit. The breakpoint can be inserted directly. Furthermore, the unloaded image of the module can also have a breakpoint associated with it. The breakpoint can be inserted directly into the module image, or a breakpoint request can be generated, and the breakpoint is inserted when the module is loaded into the execution environment of the attached processor unit.

27 Claims, 4 Drawing Sheets

U.S. PATENT DOCUMENTS

| | | | |
|---|---|---|---|
| 6,446,137 | B1 | 9/2002 | Vasudevan et al. |
| 6,480,818 | B1 * | 11/2002 | Alverson et al. ............. 703/26 |
| 6,526,491 | B2 | 2/2003 | Suzuoki et al. |
| 6,671,746 | B1 | 12/2003 | Northrup |
| 6,704,842 | B1 | 3/2004 | Janakiraman et al. |
| 6,735,601 | B1 | 5/2004 | Subrahmanyam |
| 6,738,977 | B1 | 5/2004 | Berry et al. |
| 6,760,907 | B2 * | 7/2004 | Shaylor ...................... 717/158 |
| 6,779,049 | B2 | 8/2004 | Altman et al. |
| 2002/0078308 | A1 | 6/2002 | Altman et al. |
| 2002/0144241 | A1 * | 10/2002 | Lueh ......................... 717/136 |
| 2004/0205697 | A1 | 10/2004 | Hylands et al. |

OTHER PUBLICATIONS

Orr et al., "OMOS—An Object Server for Program Execution", © 1992, IEEE, p. 200-209.

"Chapter 7: Linking", © 1998 Micro Focus Limited, p. 1-11.

Winner, "Naming and Binding in a Vertical Migration Environment", © 1988 IEEE, p. 599-607.

Implementing a component architecture on multiple distributed object frameworks—Ben-Shaul, I.; Gish, J.W.; Robinson, W.; Enterprise Distributed Object Computing Workshop, 1998. EDOC '98. Proceedings. Second International, Nov. 3-5, 1998; pp. 319-329.

Experience with secure multi-processing in Java—Balfanz, D.; Distributed Computing Systems, 1998. Proceedings. 18th International Conference on May 26-29, 1998; pp. 398-405.

A toolkit for detecting and analyzing malicious software—Weber, M.; Schatz, M.; Geyer, D.; Computer Security Applications Conference, 2002. Proceedings. 18th Annual, Dec. 9-13, 2002; pp. 423-431.

Debugging protocol for remote cross development environment—Seungwoo Son; Chaedeok Lim; Neung-Nam Kim; Real-Time Computing Systems and Applications, 2000. Proceedings. Seventh International Conference on, Dec. 12-14, 2000; pp. 394-398.

Reflections on remote reflection—Richmond, M.; Noble, J.; Computer Science Conference, 2001. ACSC 2001. Proceedings. 24th Australasian, Jan. 29-Feb. 4, 2001; pp. 163-170.

* cited by examiner

METHOD AND APPARATUS FOR SETTING BREAKPOINTS WHEN DEBUGGING INTEGRATED EXECUTABLES IN A HETEROGENEOUS ARCHITECTURE

CROSS-REFERENCE TO RELATED APPLICATIONS

This application relates to co-pending U.S. patent applications entitled "METHOD AND ARRARATUS FOR OVERLAY MANAGEMENT WITHIN AN INTEGRATED EXECUTABLE FOR A HETEROGENEOUS ARCHITECTURE" (application Ser. No. 10/280,242), "METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE" (application Ser. No. 10/280,187,); "METHOD AND APPARATUS FOR MAPPING DEBUGGING INFORMATION WHEN DEBUGGING INTEGRATED EXECUTABLES IN A HETEROGENEOUS ARCHITECTURE" (application Ser. No. 10/280,243,), and "METHOD AND APPARATUS FOR CREATING AND EXECUTING INTEGRATED EXECUTABLES IN A HETEROGENEOUS ARCHITECTURE" (application Ser. No. 10/280,244,), filed concurrently herewith and having the same inventors, Michael Karl Gschwind, Kathryn M. O'Brien, John Kevin O'Brien, and Valentina Salapura.

TECHNICAL FIELD

The invention relates generally to multiprocessing and, more particularly, to employing a debugger on code and data targeted to a plurality of processors in a parallel processor computing system.

BACKGROUND

Parallel processing, which generally comprises employing a plurality of microprocessors coupled to the same computer system to concurrently process a batch of data, is of great importance in the computer industry. Generally, there are three major types of parallel processing. These are parallel processing systems employing shared memory or distributed memory, or a combination of the two. Typically, shared memory is memory that can be accessed in a single operation, such as a "load" or "read" command, by a plurality of processors. Distributed memory is memory that is localized to an individual processor. In other words, in a distributed system, each processor can access its own associated memory in single access operation, but typically cannot access memories associated with the other processors in a single operation. Finally, there is a hybrid, or "heterogeneous," parallel processing, in which there is some shared memory among one or more processors, also known as system memory, and some memory which is distributed and local to at least one processor.

One such example of a hybrid parallel processor system comprises at least one reduced instruction set (RISC) main processor unit (MPU), such as a PowerPC™ processor, and at least one specialized or "attached" processor unit (APU), such as a Synergistic™ APU (SPU). Typically, the MPU is employed to execute general purpose code, wherein the general purpose code comprises complex control flows and orchestrating the overall hybrid parallel processing function. The MPU has access to the full range of system memory. The APU is generally directed to executing dataflow operations. In other words, the APU calculates highly repetitive multimedia, graphics, signal, or network processing workloads which are identified by high compute to control decision ratios. In conventional hybrid systems, APUs do not have access to the system memory, and their own memory, the local store, is typically smaller than the shared memory.

Generally, while employment of the hybrid system provides high computational performance, it poses significant challenges to the programming model. One such problem relates to the APU. The APU cannot directly address system memory. Therefore, any code to be run on the APU has to be transferred to an associated local storage of the APU before this code can be executed on the APU. Furthermore, the APU and the MPU can have different instruction sets.

Furthermore, additional issues exist pertaining to the debugging of software that is to be compiled and linked to run in separate execution environments. To help solve various problems during software design and implementation, programmers employ debuggers. Typically, low-level operations used by a debugger are classified as one of three primitives. A first debugger primitive involves stopping a program at a well-defined location. This requires that the debugger (1) identifies the address associated with a function name, file/line number, or other uniquely identifying source code construct, and (2) setting a break point.

A second debugger primitive concerns mapping a program location to the file/line number, function name or other uniquely identifying source code construct. This requires the debugger to map a memory address to such source construct. The memory address mapped is usually the current address of the program counter PC which involves rereading the value of the PC register by the debugger. As is understood by those of skill in the art the, program counter comprises the memory address of the instruction currently being executed.

A third debugger primitive allows reading and writing of program data. This requires that the debugger identifies the memory address associated with a data object or variable. Typically, setting a breakpoint is used in conjunction with read or write accessing the contents of the address memory location.

Generally, each of the three primitives above comprise a mapping step and an operative step. The mapping step identifies the correlation between the executable object code and the source code, whereas the operative step comprises other operations performed by the debugger. To perform the mapping step, debuggers use a mapping table and debugging tables originally generated by the compiler, and updated by the linker, describing the location of each program object, each label, the correlation between file/line numbers and object addresses, the layout of variables, the stack layout, and so on.

Typically, setting a breakpoint for a debugger in non-heterogeneous architectures occurs in one of two ways. The first way is to replace a selected instruction or data at a "breakpoint" with a trap instruction, or other such sequence which will halt normal execution of the program and transfer control to the debugger. The second way is to initialize a breakpoint register with the address value (or address range) of the breakpoint. The hardware compares the program counter, that is, the register containing the address of the instruction that is executed, with the value of one or more breakpoint registers. If the values match, a transfer of control to the debugger occurs when the value in the breakpoint register matches the program counter. Matches can include a variety of matching functions, such as "equal," "falls in a range," "less," "greater," or other Boolean functions.

However, setting a breakpoint in a heterogeneous architecture can be more complicated. For instance, the instruction sets of the separate processor components can differ. This can create problems in debugging. For instance, the code configurations of a module can differ, depending upon whether it is loaded to the second execution environment. Furthermore, when a breakpoint is set in a module which can be loaded and unloaded, it is important to maintain breakpoints correctly across such loading and unloading activity in correspondence with the requested breakpoints. Thus, when a module is replaced by another module, and later reloaded, care must be taken that all breakpoints are maintained when breakpoints have been set.

Therefore, what is needed is a debugger for employment in heterogeneous parallel processing systems that overcomes the limitations of conventional debuggers.

SUMMARY

The present invention provides a first execution environment, a second execution environment, and a breakpoint request. A module is provided with which the requested breakpoint is associated. The module is employable for transmission from the first execution environment to the second execution environment. A breakpoint request table is also provided. The breakpoint request table is read, and breakpoint indicia is extracted from the breakpoint request table. The breakpoint indicia is employable for inserting a breakpoint at the address correlated to the breakpoint request.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
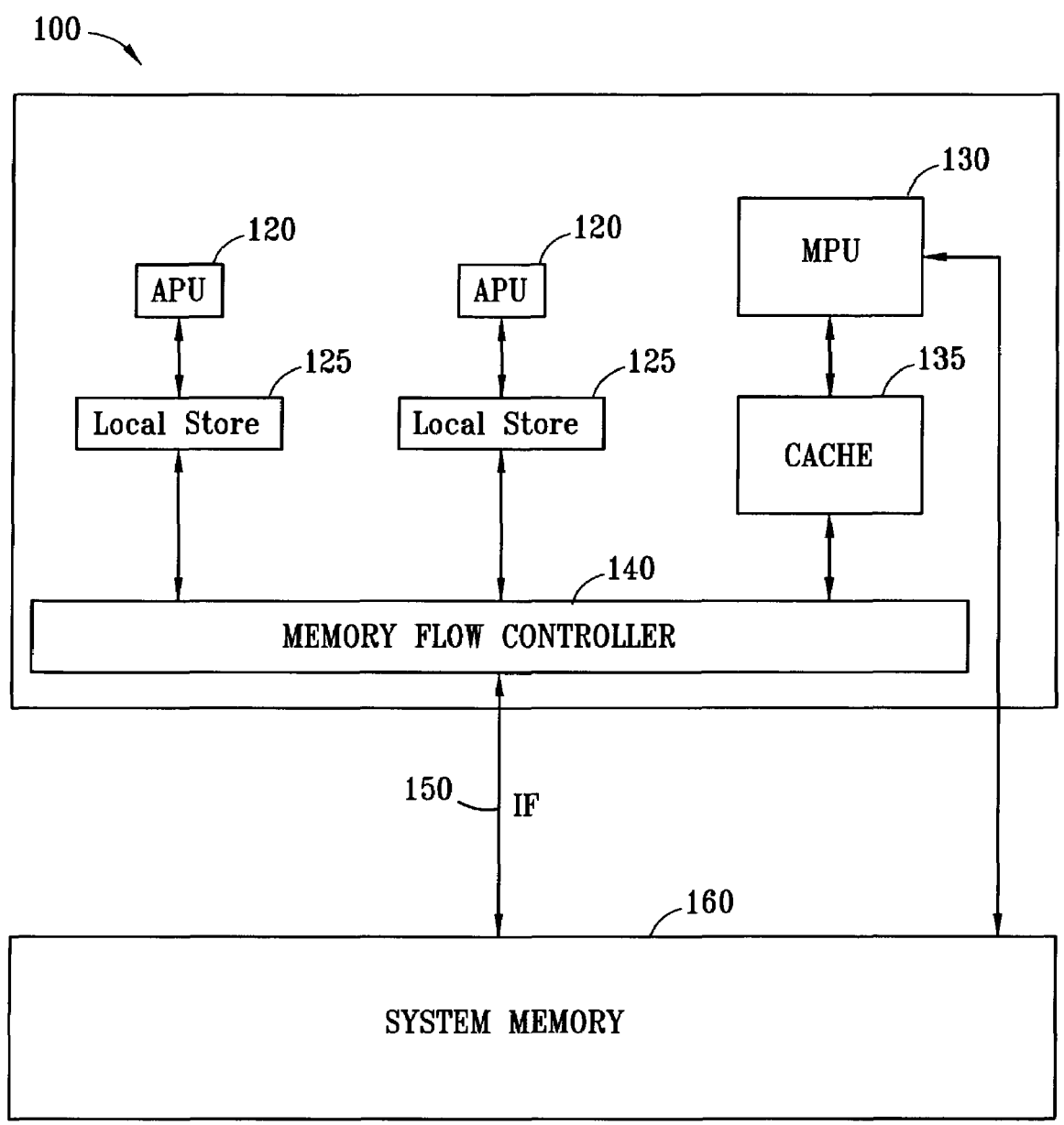
FIG. 1 schematically depicts a hybrid parallel processing environment in which to employ a debugger.

Referring to FIG. 1, the reference numeral 100 generally designates heterogeneous parallel processing architecture that provides an environment for the passing of information by employment of a stub function. The architecture 100 comprises distributed computing environment 110 and a shared system memory 160, both of which are electrically coupled by an interface 150. The environment 110 comprises a plurality of APUs 120, each with its respective local store 125. The environment 110 further comprises an MPU 130, such as an RISC processor, and its level one cache 135. In one embodiment, the MPU 130 is coupled to the system memory 160 through a signal path 145. In one embodiment, the APU comprises an SPU. In one embodiment, a single MPU 130 is employed. In a further embodiment, a plurality of MPUs 130 are employed.

The environment 110 further comprises a memory flow controller (MFC) 140. Generally, the MFC 140 enables the movement of data and synchronization capability between the MPU 130 processor and the APU 120 processors, and provides for data transfer between the main system memory 160 and local storage 125. In FIG. 1, the MFC 140 is coupled to the system memory 160 through the interface 150.

Generally, the MFC 140 enables the movement of information, both text (that is, code) and data, between the system memory 160 and the local store 125 of the APU 120, at the request of the main processor 130 or the APU 120. Because the APU 120 does not have direct access to the system memory 160, the MFC 140 transfers information between the system memory 160 and the local store 125 of the APU 120, at the request of a transfer function, such as a stub function, running on either the APU 120 or the MPU 130. In one embodiment, the MFC 140 comprises a direct memory access (DMA) device.

The architecture 100 is an environment in which an executable program runs, wherein the executable program has a stub function or stub functions embedded within it. In the stub function, code and data to be employed by the APU 120 is encapsulated as a software "object." Generally, the stub function commands the MFC 140 to transfer information between two separate execution environments, such as the system memory 160 and the local store 125. The stub function enables the MPU 130 to stream code and data to the local store 125 of the APU 120 for processing, for the APU 120 to perform the processing, and for the APU 120 to then stream the processed data back to the MPU 130. This processing of the data and code performed by the APU 120 is invisible to the MPU 130, and allows the MPU 130 to concurrently perform other data processing or program flow control tasks concurrently.

Typically, the stub function commands the MFC 140 to stream both code and data to the local store 125 of the APU 120 from designated addresses in the system memory 160. The stub function also commands the MFC 140 to command the APU 120 to process the data. Typically, the stub function is the single entry point to the APU 120. In other words, the APU 120, or its associated local store 125, is typically only accessed through the stub function. In a further embodiment, the streamed code also contains within it another stub function. This streamed stub function enables the APU 120 to command the MFC 140 to send processed data back to the shared memory 160 when the APU 120 is finished data processing. When the stub objects are stored in the local stores 125 of the APUs 120, corresponding memory addresses change for the different mapping indicia.

The stub objects embedded either in the system memory 160 and the local store 125 can have a breakpoint inserted into their code or data. Generally, the breakpoint enables the programmer to stop the execution of the integrated executable at a specific code or data location. This can be performed by the environment 100 with a trap instruction, or other such sequence which will halt normal execution of the program and transfer control to the debugger. Also, the environment 100 can initialize a breakpoint register with the address value (or address range) of the breakpoint. The hardware compares the program counter with the value of one or more breakpoint registers. The debugger further has means to read contents of various memory locations when control has passed to the debugger and to convey this information to the programmer.

Figure 2:
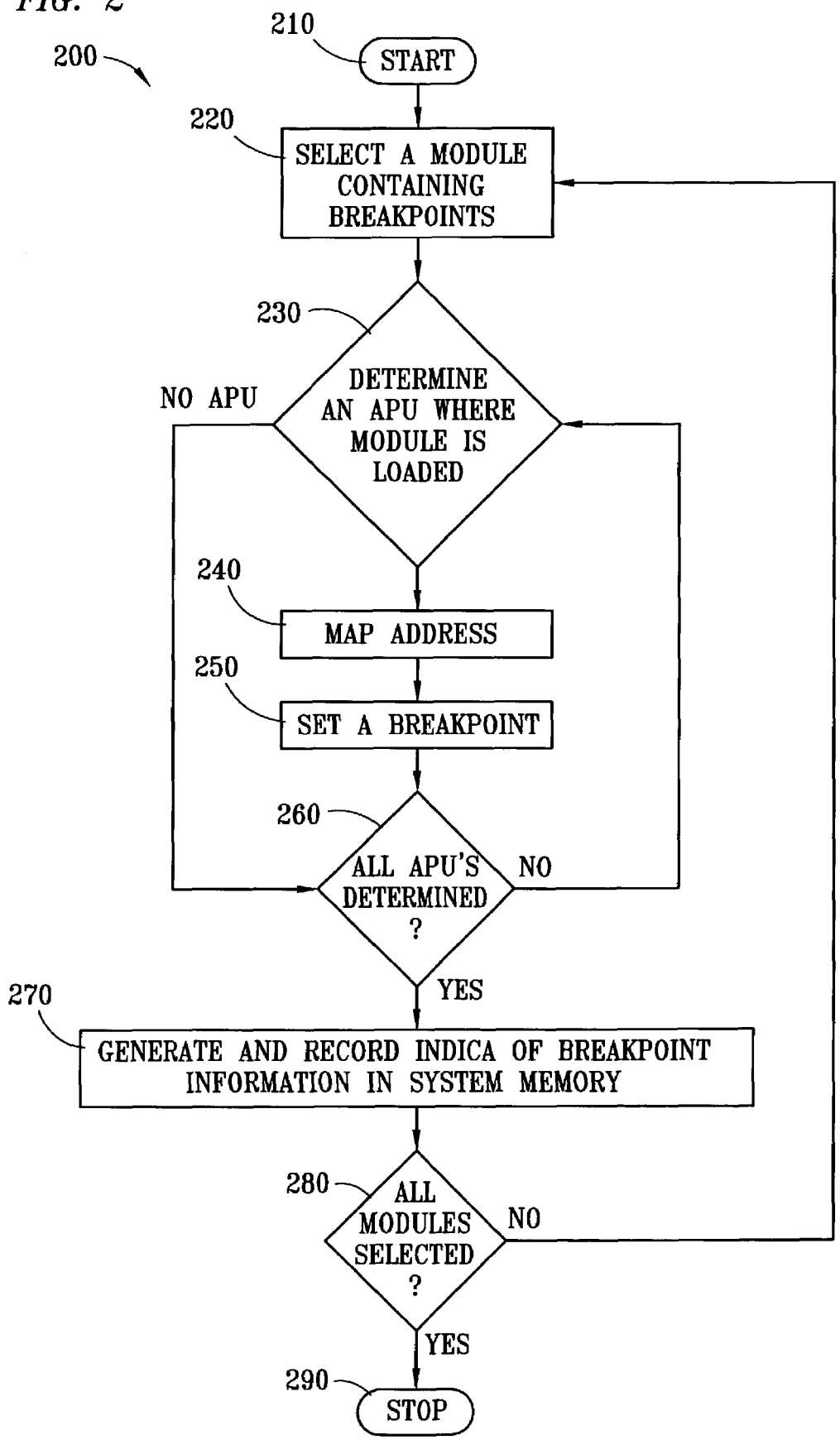
FIG. 2 illustrates a method for setting breakpoints in the local store associated with an APU.

Turning now to FIG. 2, illustrated is method 200 for inserting a breakpoint into a module that is executable in the second execution environment, such as the local store 125. After start 210, the method 220 locates a module containing selected mapping indicia, such as a variable, a line number and file name, or other suitable indicia, as one skilled in the art will understand. Generally, this location is performed through consulting a mapping indicia table in which the correspondence between a desired mapping indicia and the desired module is recorded. The address of the mapping indicia then corresponds to the placement of at least one breakpoint.

In step 230, the method 200 then determines if the module associated with the desired breakpoint is stored in at least one second execution environment, such as the local store 125. If there is no selected module associated with the desired breakpoint loaded to at least one second execution environment, the method 200 executes step 260. However, if there is a selected module loaded to at least one second execution environment, the method 200 determines to which local store 125 of the attached APUs 120 the selected module is loaded. Generally, this location is performed through consulting a mapping indicia table in which the information as to which local store 125 the module is stored, if any.

In step 240, the method 200 maps the address from the mapping indicia to the desired breakpoint. The map address 240 employs the offset of the desired offset from the beginning of the loaded module to locate the desired breakpoint in the loaded module. In one embodiment, the map address 240 employs a mapping indicia table for this determination.

In step 250, the method 200 sets a breakpoint at the mapped address, determined in step 240, in the selected loaded module. Setting a breakpoint can comprise inserting an operation code, such as a trap instruction set, writing to a breakpoint register for the APU 120, or other methods for setting a breakpoint known to those of ordinary skill in the art. In one embodiment, when employing the trap instruction, setting the breakpoint further comprises copying the contents of the mapped address to a separate portion of a memory before inserting the breakpoint. This enables the contents to be restored to the breakpoint location at a later time, such as when deleting the breakpoints.

In step 260, the method 200 determines if all the local stores 125 of the APUs 120 containing the selected module have been determined and processed by steps 240 and 250. If not, the method 200 repeats step 230. If all APUs 120 containing the selected module have been determined and processed, step 270 executes.

In step 270, breakpoint information and indicia associated with the breakpoint corresponding to the local store 125 is generated and recorded. This breakpoint information and indicia generally comprises information stored in the shared memory 160. Generally, the indicia of the breakpoint is employable for future loads of the same module to a second execution environment.

In a first embodiment, the breakpoint information, such as information generated by the map address 240, comprises a trap instruction written into the image of the unloaded module in the system memory 160, thereby overwriting some information embedded therein. Therefore, when the selected module is copied to be loaded into the second execution environment, it will have the breakpoint pre-loaded. Similar to step 250, setting the breakpoint further comprises copying the contents of the mapped address to a separate portion of memory before debugging is inserted.

In a second embodiment, information within the unloaded module image itself is not overwritten. Instead, a breakpoint request is created, and the breakpoint request is loaded into a breakpoint request summary table. Employing a breakpoint request can be due to such factors as the selected module image stored in read only memory, the use of breakpoint registers in lieu of inserting trap instructions into the instruction stream in order to indicate a breakpoint, the attempt to circumvent a patent which covers one or the other means, or other suitable factors, as one skilled in the art will understand. In this second embodiment, when the module image is loaded into the local store 125 from the system memory 160, the environment 100 consults the breakpoint summary table to determine whether a breakpoint should be inserted in this loaded module and, if so, where.

In step 280, the method 200 determines whether all of the modules having the requested mapping indicia, and therefore correlating to the requested breakpoints, have been selected and processed by the method 200. If all of the modules having the requested mapping indicia have not been selected and processed by the method 200, then step 220 starts. If all of the modules having the requested mapping indicia have been selected and processed by the method 200, then the method ends in step 290.

Figure 3:
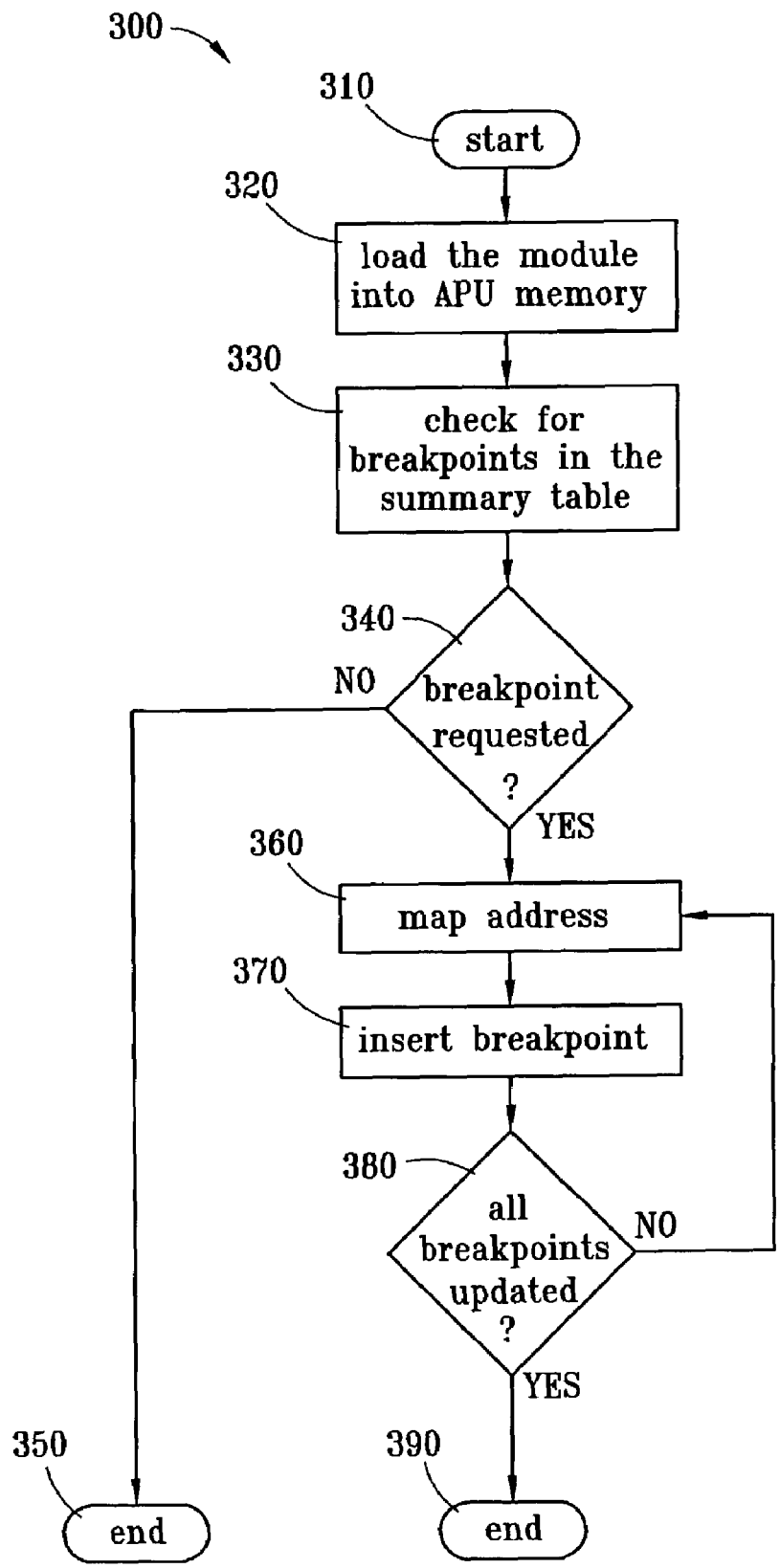
FIG. 3 illustrates a method for setting breakpoints in the memory associated with an APU when loading a module from the system memory to the local store associated with an APU.

Turning now to FIG. 3, illustrated is a method 300 for inserting breakpoints through the employment of the breakpoint summary table when loading modules into the second execution environment. Generally, the method 300 is employed when the master copy of the module to be loaded is not modified in the system memory 160. After start 310, step 320 loads a module from the first execution environment into the local store 125 of the APU 120. In step 330, the method 300 reads the breakpoint request table to see if there is a breakpoint request in the breakpoint summary table. Step 340 determines if breakpoints are requested. If no breakpoints are requested, then end step 350 executes.

However, if there is a breakpoint request, step 360 executes. Step 360 reads the breakpoint request to determine which mapping indicia is desired. Then, the method 300 accesses a map table, wherein offset of the indicia is stored. This offset is the address at which the breakpoint will be inserted in the loaded module.

In step 370, a breakpoint is inserted into the loaded module at the address indicated by step 360. Similar to method 200, setting the breakpoint can further comprise copying the contents of the mapped address to a separate portion of memory before debugging is inserted. In step 370, the address of the breakpoint would be written to a breakpoint register associated with the particular second execution environment, such as the local store 125 of the APU 120. In one embodiment, each of these separate execution environments has a separate set of breakpoint registers.

In step 380, the method 300 determines whether all of the breakpoints in the breakpoint request table corresponding to the current module have been inserted into the loaded module. If they have not, step 360 executes, and the map address of the next breakpoint is determined. If all of the breakpoints in the breakpoint requested table have been inserted into the loaded module, the method 300 ends.

Figure 4:
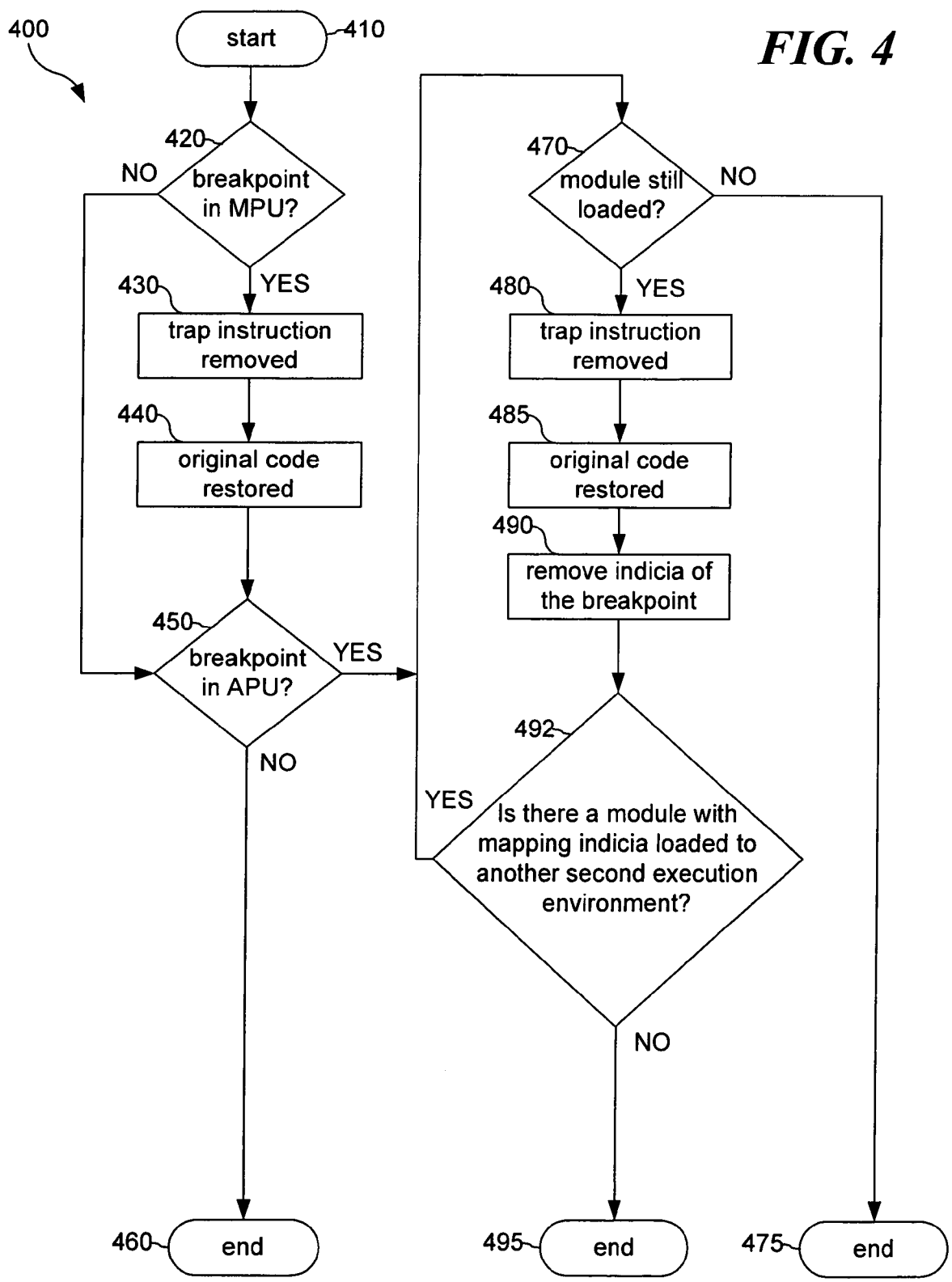
FIG. 4 illustrates a method for deleting breakpoints in both the local store and the system memory.

Turning now to FIG. 4, disclosed is a method 400 for deleting breakpoints. Although method 400 illustrates the deleting of breakpoints in the main memory code (that is, code targeted for execution in the first execution environment) as well as associated attached code modules, in one embodiment of the present invention, no setting or deleting of breakpoints in the main code module is required.

After start 410, the method 400 determines whether there is a breakpoint associated with the current mapping indicia for which breakpoints are to be deleted in the main module of the MPU 130. If not, then step 450 executes. However, if there are breakpoints in the main module code, in step 430, the corresponding trap instruction is removed, and in step 440 the original code is restored.

In step 450, the method 400 determines whether there are any breakpoints associated in a module targeted for the APU 120. In one embodiment, this can be determined by mapping the mapping indicia to a list of dynamic occurrences, that is, by enumerating possible breakpoints that can be associated with the mapping indicia for which associated breakpoints are to be deleted. In another embodiment, a user-specified breakpoint number or other identifier, and the specified breakpoint or identifier can be used to access the breakpoint request table. If there are no breakpoints associated with the APU 120, the method 400 ends at step 460. However, if there is a breakpoint associated with the APU 120, the method executes step 470.

In step 470, the method 400 determines whether the module associated with one or more breakpoints is loaded to the local store 125 of the APU 120. If the selected module is not loaded, the method 400 ends in step 475.

However, in step 470, if the module is still loaded to memory, the map table is accessed, and the memory offset for the breakpoint is determined. In one embodiment, the trap instruction in the selected loaded module is removed in step 480, and the original code in the module is restored in step 485. In another embodiment, steps 480 and 485 are replaced by refreshing the breakpoint register which contains the address associated with this breakpoint.

In step 490, indicia of the breakpoint is also removed. In one embodiment, this comprises removing the trap instruction from the corresponding module image in the main memory 160. In a second embodiment, the corresponding breakpoint request is removed from the breakpoint request summary table. Therefore, the selected module can be loaded and unloaded without this particular breakpoint being inserted at load time. After step 490, step 492 executes. Generally, step 492 determines if there are any more modules with indicia that are set for a breakpoint and loaded into another separate execution environment, such as the local store 125 of a second APU 120. If there are more modules with breakpoints loaded, then step 470 is executed. If not, end step 495 is executed.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for setting a breakpoint, comprising:
selecting mapping indicia correlating to the breakpoint;
returning a memory address corresponding to the mapping indicia;
selecting a code module associated with execution in at least one second execution environment, of at least one first execution environment and the at least one second execution environment, wherein the second execution environment is different from the first execution environment, and wherein the selected code module contains the selected mapping indicia;
determining if the selected code module is loaded into the at least one second execution environment from the at least one first execution environment;
setting the breakpoint in the at least one second execution environment at the returned memory address if the second execution environment contains the selected code module;
generating breakpoint indicia associated with setting the breakpoint if the second execution environment contains the selected code module; and
recording the breakpoint indicia, wherein the breakpoint indicia comprises information employable for loading the module to at least one second execution environment.

2. The method of claim 1, wherein the step of selecting a code module associated with execution in at least one second execution environment further comprises selecting a plurality of code modules directed at execution in a second execution environment.

3. The method of claim 1, wherein the memory address is embedded in the first execution environment and further comprising a step of copying the contents of the memory address into a separate information storage location.

4. The method of claim 1, wherein the step of setting the breakpoint comprises inserting a trap function.

5. The method of claim 1, wherein the step of setting a breakpoint further comprises inserting an operation code into the corresponding memory address of a corresponding module image that is resident in the first execution environment.

6. The method of claim 5, wherein the step of inserting an operation code comprises employing the sum of both the address returned by the mapping indicia and the load memory address of a loaded code module.

7. The method of claim 1, wherein the loaded code module is loaded to the second execution environment and further comprising determining the load memory address of a loaded code module in the second execution environment.

8. The method of claim 1, further her comprising inserting the breakpoint at a corresponding memory address in the second execution environment if the memory address corresponds to the first execution environment.

9. The method of claim 1, wherein recording information comprises modifying a corresponding image of the selected code module in a shared memory.

10. The method of claim 1, wherein recording information comprises writing information to a breakpoint request table.

11. A method for inserting breakpoints when loading modules in a heterogeneous system from a first execution environment to a second execution environment, wherein the second execution environment is different from the first execution environment, comprising:
    loading a module into the second execution environment from the first execution environment;
    determining if a breakpoint is selected for the loaded module; and
    inserting a breakpoint in the loaded module.

12. The method of claim 11, wherein the step of determining comprises reading a breakpoint request table.

13. The method of claim 11, further her comprising a step of copying the contents of the memory address corresponding to the breakpoint of the loaded module to a separate information storage location.

14. A method for deleting breakpoints in a parallel processor architecture, comprising:
    selecting a breakpoint to be deleted;
    determining if the selected breakpoint to be deleted correlates to a memory address in one of either a first execution environment or a second execution environment, wherein the second execution environment is different from the first execution environment;
    deleting the breakpoint associated with the memory address in the one of either a first execution environment or a second execution environment;
    determining if a breakpoint request has been recorded for the breakpoint associated with the determined execution environment; and
    deleting the breakpoint request if the breakpoint request has been recorded.

15. The method of claim 14, farther comprising inserting original information at the breakpoint.

16. The method of claim 14, wherein the step of deleting a breakpoint in the determined environment farther comprises deleting a breakpoint in a main module stored in a shared memory.

17. The method of claim 14, wherein the step of deleting a breakpoint in the determined environment farther comprises deleting a breakpoint in a module image corresponding to a load module, wherein the module image corresponding to the load module is stored in a shared memory.

18. The method of claim 14, wherein the determined execution environment is the second execution environment and further comprising a step of querying the determined execution environment if the module in which the breakpoint is embedded is loaded into the second execution environment.

19. The method of claim 14, wherein the step of deleting a breakpoint in the determined second execution environment comprises determining if the module associated with the breakpoint is loaded to the second execution environment.

20. A method for setting breakpoints in a parallel processing environment, comprising:
    selecting a breakpoint in code;
    determining if a requested breakpoint correlates to a code address to be executed in one of either a first execution environment or a second execution environment, in a system comprising a first execution environment and a second execution environment, wherein the second execution environment is different from the first execution environment;
    mapping the breakpoint to its corresponding memory address of code;
    inserting an operation code at the address returned by the mapping if the breakpoint correlates to code targeted to the first execution environment; and
    setting breakpoints of the code in the second execution environment if the breakpoint correlates to a module loaded into the second execution environment.

21. The method of claim 20, further comprising recording information associated with the requested breakpoint, wherein the information comprises indicia employable for loading the module to at least one second execution environment.

22. The method of claim 20, wherein the operation code comprises a trap function.

23. The method of claim 20, wherein determining further comprises determining if a requested breakpoint maps to both the first execution environment and the second execution environment.

24. The method of claim 20, further comprising a step of overwriting information in the first environment with the operation code.

25. The method of claim 24, further comprising a step of copying the information to be overwritten into a separate information storage location before the step of overwriting information.

26. A parallel processing system, comprising:
    a first execution environment;
    a second execution environment, wherein the second execution environment is different from the first execution environment;
    a breakpoint request table, wherein the breakpoint request table is located in the first execution environment;
    a breakpoint request indicia, wherein the breakpoint request indicia is employable for extraction from the breakpoint request table, and the breakpoint request indicia is further employable for inserting a breakpoint at the address correlated to the breakpoint request indicia; and
    a module with which the requested breakpoint indicia is associated, wherein the module is further employable for transmission from the first execution environment to the second execution environment.

27. A processor for setting breakpoints in a parallel processing environment, the processor including a computer program comprising:
    computer code for selecting a breakpoint in code;
    computer code for determining if a requested breakpoint correlates to a code address to be executed in one of either a first execution environment or a second execution environment, in a system comprising a first execution environment and a second execution environment, wherein the second execution environment is different from the first execution environment;

computer code for mapping the breakpoint to its corresponding memory address of code;
computer code for inserting an operation code at the address returned by the mapping if the breakpoint correlates to code targeted to the first execution environment; and
computer code for setting breakpoints of the code in the second execution environment if the breakpoint correlates to a module loaded into the second execution environment.

* * * * *